Patented Aug. 12, 1947

2,425,628

UNITED STATES PATENT OFFICE 2,425,628

PREPARATION OF AMINOACETALS

Donald John Loder and Walter Martin Bruner, Wilmington, Del., assignors to E. I. du Pont de Nemours & Company, Wilmington, Del., a corporation of Delaware No Drawing. Application February 14, 1942, Serial No. 430,995

9 Claims. (Cl. 260—584)

This invention relates to aminoacetals, to processes for their preparation, and more particularly to aminoformals and their preparation by the hydrogenation of cyanoformals.

An object of the invention is to provide new chemical compounds. Another object is to provide aminoacetals by the hydrogenation under suitable conditions of corresponding cyanoacetals. Yet another object of the invention is to provide diaminoacetals by the hydrogenation of corresponding dicyanoacetals, the hydrogenation being effected in the presence of a suitable hydrogenation catalyst and ammonia. Other objects and advantages of the invention will hereinafter appear.

The aminoacetals are obtained by hydrogenating cyanoacetals while in contact with hydrogenation catalysts and preferably conducting the hydrogenation in the presence of ammonia. The reaction may be illustrated as proceeding in accord with the equations:

(1) $ROCR'_2OCR'_2YCN \xrightarrow{H_2} ROCR'_2OCR'_2YCH_2NH_2$ (2) $NCYCR'_2OCR'_2OCR'_2YCN \xrightarrow{2H_2}$

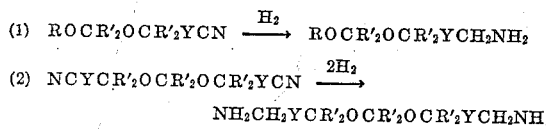

in which R is an alkyl or substituted alkyl group, R' is hydrogen, alkyl, or a substituted alkyl group and Y is a single bond or an alkyl group. The cyanoacetals are prepared in accord with the process described in applicants' copending application S. N. 430,994, filed February 14, 1942, wherein these compounds are made by mixing an acetal, such as methylal, and a cyanohydrin, such as formaldehyde cyanohydrin, with a catalyst, such as sulfuric acid, phosphoric acid or the like and heating the resulting mixture to a temperature from room temperature to approximately 300° C. Pressures may be used if desired and in order to force the reaction to completion the alcohol produced as a result of the reaction may be withdrawn as formed. After the reaction, the catalyst is preferably neutralized prior to the recovery of the cyanoacetal by distillation.

The reaction is preferably conducted in the liquid phase and in the presence of a suitable active hydrogenation catalyst such, for example, as a nickel, cobalt, fused nickel-copper, copperchromite, catalyst or other hydrogenation catalyst known to be useful in the hydrogenation of nitriles to amines. The reaction can be conducted in the liquid or vapor phase at temperatures ranging from 25 to 200° C. and at pressures between 1 and 1000 atmospheres although it is preferred to conduct the hydrogenation of these nitriles at temperatures between 75 and 150° C. and under pressures between 200 and 700 atmospheres.

It has likewise been found that polyamine formation during hydrogenation is inhibited, yields are increased, and the reaction goes more smoothly if there be present during the reaction from 1 to 20 moles of ammonia per mole of the nitrile. If desired, the nitrile to be hydrogenated may be dissolved in aqueous ammonia or the nitrile may be dissolved in a suitable solvent such, for example, as methanol, di(isopropyl) ether, dioxane, or 1,3-dioxolane, which is not decomposed or hydrogenated during the reaction or decomposed by the ammonia added to the solution.

The more detailed practice of the invention is illustrated by the following examples in which parts are by weight unless otherwise stated:

*Example 1.*—A reaction mixture consisting of 111 parts of (methoxymethoxy) acetonitrile, $CH_3OCH_2OCH_2CN$ 200 parts of ammonia, and 40 parts of an active nickel hydrogenation catalyst was subjected to the action of hydrogen at a temperature of 110° C. and a pressure of 700 atmospheres. The reaction mixture was filtered and the filtrate fractionated for the recovery of methyl aminoethyl formal, $CH_3OCH_2OCH_2CH_2NH_2$, which is a watersoluble, colorless liquid boiling at 56° C. and at 30 mm. pressure.

*Example 2.*—A reaction mixture consisting of 145 parts of (methoxyethoxymethoxy) acetonitrile, $CH_3OCH_2CH_2OCH_2OCH_2CN$, 85 parts of ammonia, and 20 parts of an active nickel hydrogenation catalyst was hydrogenated at a temperature of 110° C. and 700 atmospheres; the reaction mixture was filtered and the filtrate fractionated for the recovery of methoxyethyl aminoethyl formal, $CH_3OCH_2CH_2OCH_2OCH_2CH_2NH_2$, a colorless, water-soluble liquid having a boiling point of 34° C. at 5 mm.

*Example 3.*—A reaction mixture consisting of 143 parts of (isobutoxymethoxy) acetonitrile,

51 parts of ammonia, 100 parts of diisopropyl ether and 20 parts of a nickel hydrogenation catalyst was hydrogenated at 110° C. and 700 atmospheres. The reaction mixture was filtered and the filtrate fractionated for the recovery of isobutyl aminoethyl formal,

which is a water-soluble liquid having a boiling point of 50° C. at 3 mm.

Example 4.—A reaction mixture consisting of 78.3 parts of (isobutoxymethoxy) acetonitrile, 100 parts of ammonia, and 20 parts of an active nickel hydrogenation catalyst supported on kieselguhr was subjected to the action of hydrogen at 100° C. and 700 atmospheres pressure for 1.5 hours. After removing catalyst the product was distilled. Isobutyl aminoethyl formal, (CH₃)₂CHCH₂OCH₂OCH₂CH₂NH₂ was obtained in 91.5% yield.

Example 5.—A reaction mixture consisting of 50 parts of (isobutoxymethoxy) acetonitrile, 100 parts of diisopropyl ether, 20 parts of an active nickel hydrogenation catalyst (prepared as in Example 4) and 50 parts of ammonia was subjected to the action of hydrogen at 100° C. and 700 atmospheres pressure for one hour. After removing the catalyst the product was distilled. Isobutyl aminoethyl formal was obtained in 79.9% yield.

Example 6.—A reaction mixture containing 115 parts of (methoxymethoxy) acetonitrile,

CH₃OCH₂OCH₂CN and 204 parts of ammonia were hydrogenated in the presence of 60 parts of a nickel catalyst at a temperature of 110° C. and 700 atmospheres. The reaction mixture was filtered and the filtrate fractionated for the recovery of methyl aminoethyl formal, CH₃OCH₂OCH₂CH₂NH₂, which is a water-soluble liquid having a boiling point of 57° C. at 20 mm.

Example 7.—A reaction mixture consisting of 184 parts of (isobutoxymethoxy) isovalero nitrile,

OCH₂OC₄H₉
|
(CH₃)₂CHCHCN and 100 parts of ammonia was hydrogenated in the presence of 50 parts of an active nickel catalyst at a temperature of approximately 100° C. and under a pressure of 700 atmospheres. The reaction product was filtered and the filtrate fractionated for the recovery of isobutyl 1-amino-3-methyl-2-butyl formal,

OCH₂OC₄H₉
|
(CH₃)₂CHCHCH₂NH₂ a water-white oil slightly soluble in water having a boiling point of 65° C. at 2 mm.

Example 8.—A reaction mixture consisting of 49½ parts of (methoxymethoxy) propionitrile,

CH₃
|
CH₃OCH₂OCHCN and 200 parts of ammonia was hydrogenated at a temperature of approximately 100° C. and under pressure of approximately 700 atmospheres in the presence of 50 parts of a nickel catalyst. The catalyst was removed by filtration and the filtrate fractionally distilled for the recovery of methyl-1-amino-2-methyl-2-ethyl formal,

CH₃
|
CH₃OCH₂OCHCH₂NH₂ a water-soluble oil having a boiling point of 42° C. at 8 mm.

Alkylnitriles, generally, which contain an acetal and more particularly those which contain a formal group can be hydrogenated in accord with the invention. As examples of these may be specifically designated methoxy, ethoxy, n- and isopropoxy, n- and isobutoxy, methoxy acetonitriles as well as similar propionic, butyric, valeric, and higher acid nitriles. As examples of the dinitriles are included cyanoalkyl acetals generally and more particularly such nitriles as the cyanomethyl, cyanoethyl, cyanopropyl, cyanobutyl, symmetrical acetals which have the formula (NCCR₂O)CR'₂ in which R is methyl, ethyl, propyl or butyl group respectively and in which R' may be hydrogen and/or an alkyl group.

The above aminoacetals are intermediates in the preparation of valuable products for use in the textile and allied arts.

We claim:

1. A process for the preparation of aminoformals which comprises hydrogenating a cyanoformal in the presence of a hydrogenation catalyst and ammonia at a temperature between 25 and 200° C. and at a pressure between 200 and 700 atms.

2. A process for the preparation of an alkyl aminoalkyl formal which comprises hydrogenating an (alkoxymethoxy) alkyl nitrile in the presence of a hydrogenation catalyst and ammonia at a temperature between 25 and 200° C. and under a pressure of 200 and 700 atmospheres.

3. A process for the preparation of an alkyl aminoethyl formal which comprises hydrogenating an (alkoxymethoxy) acetonitrile in the presence of a hydrogenation catalyst and ammonia at a temperature between 25 and 200° C. and a pressure between 200 and 700 atmospheres.

4. A process for the preparation of methyl aminoethyl formal which comprises hydrogenating 145 parts of (methoxymethoxy) acetonitrile in the presence of 40 parts of a nickel hydrogenation catalyst and 85 parts of ammonia at a temperature of approximately 110° C. and 700 atmospheres, and subsequently recovering from the reaction mixture the aminoethyl methyl formal.

5. An alkyl aminoethyl formal having the formula ROCH₂OCH₂CH₂NH₂, in which R is an aliphatic hydrocarbon.

6. Methyl aminoethyl formal having the formula CH₃OCH₂OCH₂CH₂NH₂ and a boiling point of 56° at 30 mm. pressure.

7. Isobutyl 1-amino-3-methyl-2-butyl formal having the formula (CH₃)₂CHCHCH₂NH₂
|
OCH₂OC₄H₉ and a boiling point of 65° at 2 mm.

8. Methyl 1-amino-2-methyl-2-ethyl formal having the formula CH₃OCH₂OCH(CH₃)CH₂NH₂ and a boiling point of 42° at 8 mm.

9. An alkyl mono aminoalkyl formal, having the formula ROCH₂OYNH₂, in which R is an alkyl group and Y is a divalent alkyl group.

DONALD JOHN LODER.
WALTER MARTIN BRUNER.

REFERENCES CITED

The following references are of record in the file of this patent:

UNITED STATES PATENTS

| Number | Name | Date |
|---|---|---|
| 2,069,302 | Dreyfus | Feb. 2, 1937 |

FOREIGN PATENTS

| Number | Country | Date |
|---|---|---|
| 796,001 | France | Mar. 27, 1936 |